United States Patent [19]
Brown et al.

[11] Patent Number: 4,930,621
[45] Date of Patent: Jun. 5, 1990

[54] ATTACHMENTS FOR POWER TURNS

[75] Inventors: Robert D. Brown; Russell J. Hogsett, both of Canon City; Richard A. Compton, Pueblo; Thomas W. Swisher, Canon City, all of Colo.

[73] Assignee: Portec, Inc., Oak Brook, Ill.

[21] Appl. No.: 245,117

[22] Filed: Sep. 16, 1988

[51] Int. Cl.⁵ .............................................. B65G 15/02
[52] U.S. Cl. .................................... 198/831; 198/837; 198/860.5; 198/836.1
[58] Field of Search ............... 198/831, 834, 835, 836, 198/837, 840, 860.1, 860.3, 860.5

[56] References Cited

U.S. PATENT DOCUMENTS

| 2,990,052 | 6/1961 | Stille et al. | 198/831 X |
| 3,100,565 | 8/1963 | Fry | 198/831 X |
| 3,189,165 | 6/1965 | Theijsmijer | 198/831 X |
| 3,217,861 | 11/1965 | Daniluk et al. | |
| 3,237,754 | 3/1966 | Freitag, Jr. et al. | |
| 3,358,811 | 1/1966 | Gerrish | |
| 3,951,256 | 4/1976 | Gurewitz | 198/831 |
| 4,202,443 | 5/1980 | Bührer | 198/831 |

FOREIGN PATENT DOCUMENTS 0098227 1/1984 European Pat. Off. ............. 198/831

Primary Examiner—Robert J. Spar
Assistant Examiner—D. Glenn Dayoan
Attorney, Agent, or Firm—Klaas & Law

[57] ABSTRACT

Attachments for a power turn which power turn has a frame having arcuate inner and outer sidewall portions and support plates forming extensions of the arcuate outer side wall portion and on which are rotatably mounted a driving roll and an idler roll. An endless belt is journaled around the driving and idler rolls and is moved thereby. A cover is mounted on the arcuate outer sidewall portion to cover the outer portion of the endless belt and an endless chain secured thereto and has a main body portion and two removable end portions. One end portion covers a sprocket of the driving roll and portions of the endless chain and the second removable end portion covers a sprocket of the idler roll and portions of the endless chain so that the removable end portions may be readily removed when it is desired to inspect these portions of the driving and idler rolls. The cover has a top wall portion on which are mounted a plurality of lugs, each of which has a support portion spaced a distance above the top wall portion. A safeguard has an arcuate side wall with a plurality of lugs mounted thereon, each of which has a support portion and is positioned so that a portion thereof mates with an arcuate inner wall portion of said top wall portion and the support portions thereof are supported on the support portions of the top wall portion. Bolts and nuts are used to secure the support portions together. The two removable end portions each have a support lug mounted thereon adapted to be secured to a flange on the safeguard.

20 Claims, 2 Drawing Sheets

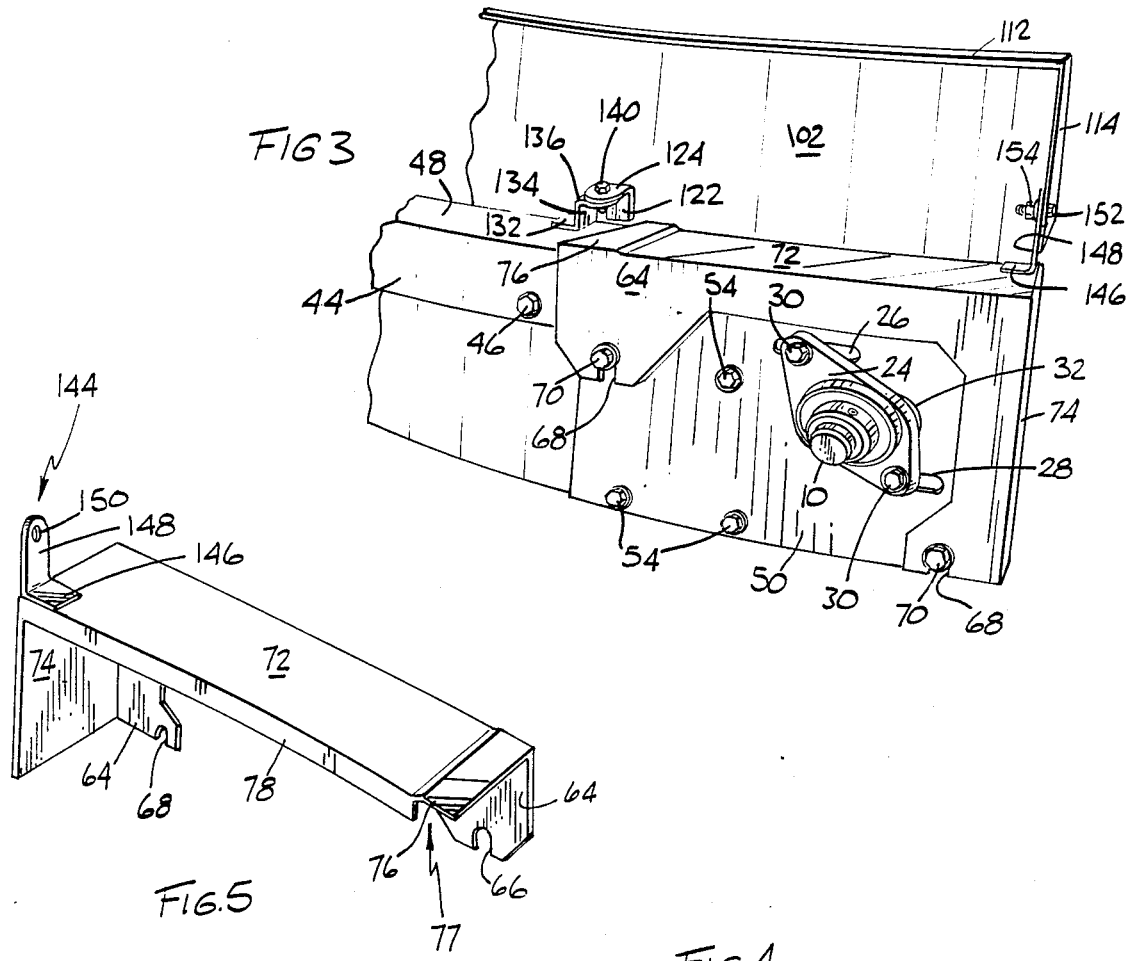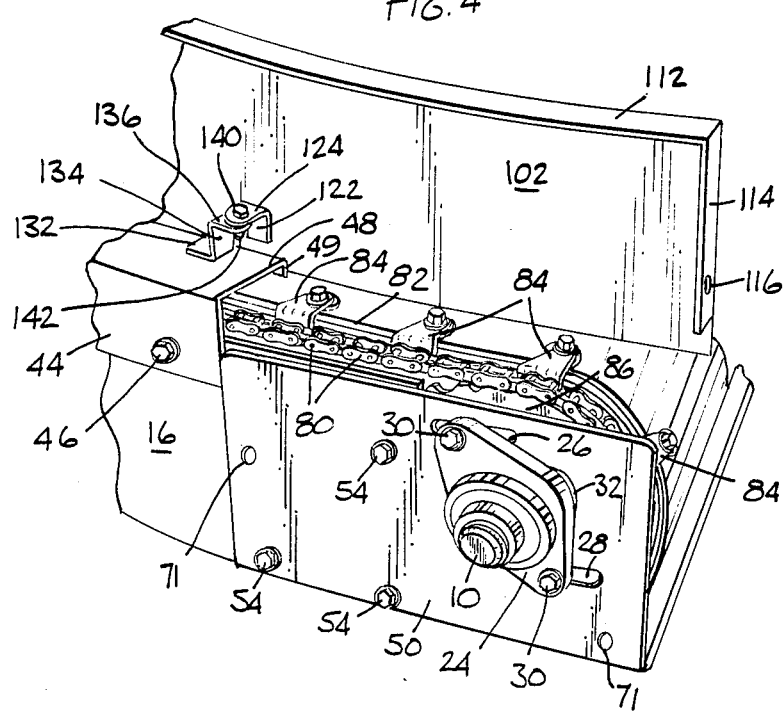

ATTACHMENTS FOR POWER TURNS

FIELD OF THE INVENTION

This invention is directed generally to power turns used to change the direction of movement of articles being moved from one location to another location on conveying systems and more particularly to attachments to such power turns for preventing articles from falling off of the power turns and for permitting ready access to the interior of the end portions of the power turns.

BACKGROUND OF THE INVENTION

In one conventional power turn, an endless belt is trained around a driven roll having a tapered outer surface and an idler roll having a tapered outer surface both of which are mounted in suitable bearings. The outer radius of the turn is greater than the inner radius. An endless chain is attached to the outer radius side of the endless belt and travels through a guideway in the frame. The endless chain is driven by a sprocket on the driven roll and is guided over a sprocket on the idler roll. A one-piece cover extends over the sockets for the driven and idler rolls and over the endless chain in the guideway. Therefore, if it is desired to inspect the endless chain at the sprockets, it is necessary to remove the entire cover and any safeguard attached thereto. The power turn, in some instances, requires the use of a safeguard to prevent articles from falling off of the power turns. These safeguards have been secured to the cover by headed threaded fasteners passing through a flange on the safeguard and the cover. Extreme care must be used to ensure that the fasteners do not contact the endless belt or the endless chain.

BRIEF DESCRIPTION OF THE INVENTION

This invention provides a cover for a power turn which cover has removable end portions so that the sprockets for the driven and idler rolls and the endless chain may be readily inspected. Also, a plurality of fastening lugs project upwardly from the upper surface of the cover to cooperate with lugs on a safeguard so that the safeguard may be installed with complete assurance that the fasteners will not contact the endless belt or the endless chain.

In the preferred embodiment of the invention, the cover for the power turn comprises an arcuately shaped angle section having a side wall portion and an integral top wall portion having a right angular relationship. The side wall portion has a plurality of spaced apart openings therein so that it may be secured to the frame of the power turn. The power turn comprises an endless belt journaled around a driving roll having a tapered outer surface in the form of a frustum of a cone and located at one end of the power turn and an idler roll having a tapered outer surface in the form of a frustum of a cone located at the other end of the power turn. The cover has a main body portion that terminates before each end of the power turn. A separate removable end portion extends the main body portion to a distance beyond the driving roll and the idler roll. Each separate removable end portion comprises an arcuately shaped angle section having a side wall and an integral top wall having a right angular relationship and an integral end wall projecting downwardly from the top wall and radially inwardly from the side wall and having at right angular relationship with each other. Spaced apart slots are formed in the side walls of the end portions to cooperate with headed fasteners for securing the end portions to an extension of the side wall portion of the power turn. Also, a portion of the top wall of the end portion is supported by a portion of the top wall portion of the cover.

Attachment means are provided for attaching a safeguard to the power turn. A plurality of angularly shaped lugs are secured to the upper surface of the top wall portion of the cover with each lug having a flat base portion adapted to be secured to the upper surface, an integral upstanding wall portion projecting upwardly from the base portion and having a right angular relationship thereto and an integral support portion projecting outwardly from the wall portion and having a right angular relationship thereto. A central opening extends through the support portion. A lug is secured to the upper surface of the top wall of the end portion and comprises a base secured to the upper surface of the top wall portion and an integral upstanding wall having a right angular relationship thereto. An opening extends through the upstanding wall. A safeguard is provided and comprises an arcuately shaped side wall having an inner surface, an outer surface, a top edge, a bottom edge and two end edges. A flange projects radially outwardly from the top edge and the two end edges. A plurality of spaced apart lugs are secured to the outer surface of the safeguard. Each lug comprises a base which is secured to the other surface and an integral support portion projecting radially outwardly therefrom and at a right angular relationship thereto. The support portion has a central opening extending therethrough and each flange extending radially outwardly from the end edge has an opening extending therethrough. The safeguard is attached to the cover and the end portions by positioning the lugs of the safeguard on the lugs of the cover and passing the stem portions of headed threaded bolts through the aligned openings and using threaded nuts on the threaded stem portion to hold the safeguard in place. Also, similar bolts pass through the aligned openings in the end flanges of the safeguard and the lugs on the end portions which are then secured together by threaded nuts.

BRIEF DESCRIPTION OF THE DRAWINGS

An illustrative and presently preferred embodiment of the invention is shown in the accompanying drawings in which:

FIG. 3 is a perspective view of a portion of a power turn having a safeguard mounted thereon and a removable end portion thereof;

FIG. 4 is a perspective view of a portion of a power turn with a safeguard mounted thereon and the removable end portion removed; and FIG. 5 is a perspective view of the inner side of the end portion.

DETAILED DESCRIPTION OF THE INVENTION

Figure 1:
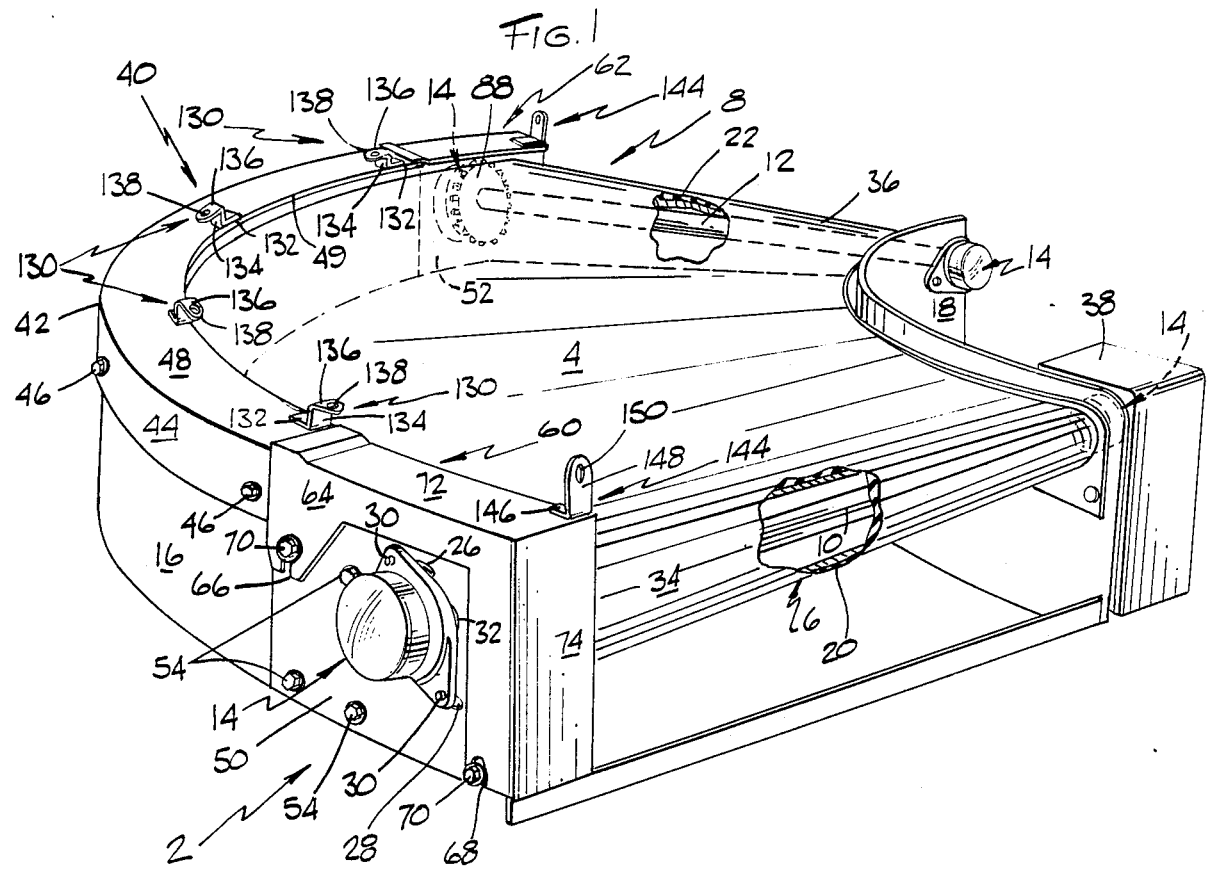
FIG. 1 is a perspective view of a power turn without an illustration of the conventional base supporting structure thereof.

In FIG. 1, there is illustrated a power turn 2 which is supported on a conventional frame (not shown). The power turn 2 comprises an endless belt 4 journaled around a driving roll 6 and an idler roll 8. The driving roll 6 has a shaft 10 and the idler roll 8 has a shaft 12 which shafts 10 and 12 are mounted for rotation in suitable bearings 14 which are mounted on the outer arcuate side wall portion 16 and the inner arcuate side wall portion 18. The driving roll 6 has a longitudinally extending axis of rotation and the idler roll has a longitudinally extending axis of rotation. In the embodiment illustrated in FIG. 1, these longitudinally extending axes of rotation have an included angle of 90 degrees therebetween, but it is conventional in power turns that this included angle is between 15 degrees and 350 degrees. A hollow body portion 20 having an outer surface shaped as a frustum of a cone is secured by conventional means (not shown) to the shaft 10 for rotation therewith. A hollow body portion 22 having an outer surface shaped as a frustum of a cone is secured by conventional means (not shown) to the shaft 12 for rotation therewith. As illustrated in FIGS. 1, 3 and 4, the bearings 14 are adjustably mounted by conventional means comprising the mounting bracket 24 which is mounted for sliding movement in a horizontal plane in the slots 26 and 28 by bolts 30 and nuts (not shown). A slot 32 allows for the sliding movement of the shafts 10 or 12. The slots 26, 28 and 32 are formed in extensions of the side wall portion 16 described below. The endless belt 4 when journaled around the driving roll 6 and the idler roll 8 has an outer radius adjacent to the arcuate outer side wall portion 16 and an inner radius adjacent to the arcuate inner side wall portion 18 and opposite end surfaces 34 and 36. Motor means 38 are mounted on the arcuate inner side wall portion 18 and are connected to the shaft 10 so as to rotate the shaft 10.

As illustrated in FIG. 1, cover means 40 are provided for the power turn 2 and comprise a main body portion 42 having an arcuate side wall portion 44 having a radius of curvature similar to the radius of curvature of the arcuate outer side wall portion 16 so as to mate therewith and secured thereto by suitable means such as headed threaded bolts 46. The cover means 40 has a top wall portion 48 which is integral with the side wall portion 44 and extends radially inwardly therefrom to form an angular relationship therewith of about 90 degrees. The top wall portion 48 has an arcuate downwardly projecting inner flange 49 to provide strength for the cover means 40 and added protection for the endless chain described below which is covered by the cover means 40. The main body portion 42 has an arcuate extent that is less than the arcuate extent of the arcuate side wall portion 18 so that it ends at locations arcuately spaced from the driving roll 6 and the idler roll 8.

Arcuate support plates 50 and 52 form extensions of the side wall portion 16 of the main body portion 42 and are secured to the side wall portion 16 by headed threaded bolts 54 and threaded nuts (not shown). The mounting bracket 24 is secured to the arcuate support plates 50 and 52 by bolts 30 passing through the slots 26 and 28 and nuts (not shown). The arcuate support plates 50 and 52 have a thickness substantially the same as the thickness of the side wall portion 44 with the outer peripheral surfaces thereof having substantially the same radii of curvature. While the arcuate support plates 50 and 52 are preferred, the side wall portion 16 itself could be extended.

As illustrated in FIGS. 1, 3, and 4, the cover means 40 has a removable end portion 60 at the driving roll 6 end of the cover means 40 and another removable end portion 62 at the idler roll 8 end of the cover means 40. Since the removable end portions 60 and 62 are mirror images, only the removable end portion 60 will be fully described. As illustrated in FIGS. 1, 3 and 5, the removable end portion 60 comprises an arcuate side wall 64 having a radius of curvature similar to the radius of curvature of the arcuate support plate 50 so as to mate therewith. The arcuate side wall 64 has a pair of spaced apart open ended slots 66 and 68 extending therethrough so that the edges of the side wall 64 defining the slots may be clamped between headed threaded bolts 70 mounted in the threaded openings 71 in support plate 50 and the arcuate outer surface of the support plate 50 so as to be secured to the arcuate support plate 50. When it is desired to remove the removable end portion 60, it is only necessary to loosen the headed threaded bolts 70 and slide the removable end portion 60 out through the open ends of the slots 66 and 68. The removable end portion 60 has a top wall 72 which is integral with the side wall 64 and extends radially inwardly therefrom to form an angular relationship therewith of about 90 degrees and an end wall 74 which is integral with the top wall 72 and side wall 64 and extends radially inwardly from the side wall 64 and downwardly from the top wall 72 to form angular relationships therewith of about 90 degrees. As illustrated in FIG. 1, a portion of the side wall 64 overlaps the joint between the side wall portion 44 and the support plate 50 and a portion of the top wall 72 overlaps and is supported on a portion of the top wall portion 48. The overlapping portion of the top wall 72 is in the form of an upwardly extending projection 76 so as to form a recess 77 for receiving the portion of the top wall portion 48. Also, an arcuate flange 78 projects downwardly from inner edge of the top wall 72 for strengthening and protection purposes and has a radius of curvature similar to the radius of curvature of the downwardly projecting inner flange 49. Each of the removable end portions 60 has an arcuate extent that is less than one-fourth of the arcuate extent of the main body portion 42.

As illustrated in FIG. 4, an endless chain 80 is secured to a radially outer portion 82 of the endless belt 4 using a plurality of securing means 84. A sprocket 86 is secured to the shaft 10 by conventional means (not shown) for rotation therewith. The sprocket 86 is in mesh with the endless chain 80 so as to drive the endless chain 80 and therefore to drive the endless belt 4. Another sprocket 88 (FIG. 1) is secured to the shaft 12 by conventional means (not shown) for rotation therewith and is in mesh with the endless chain 80 so that movement of the endless chain 80 rotates the sprocket 88 and therefore the idler roll 8. The top wall portion 48 covers the endless chain 80, the securing means 84 and the radially outer portion 82 of the endless belt 4. The top wall 72 and the end wall 74 cover the sprocket 86, the endless chain 80, the securing means 84 and the radially outer portion 82 of the endless belt 4. Therefore, when it is desired to inspect these structures, it is only necessary to remove the removable end portion 60. When it is desirable to inspect the corresponding structures associated with the idler roll 8, it is only necessary to remove the removable end portion 62. In the preferred embodiment, the removable end portions 60 and 62 are formed from steel plate but can be internally molded from a plastic material having comparable strength characteristics.

Figure 2:
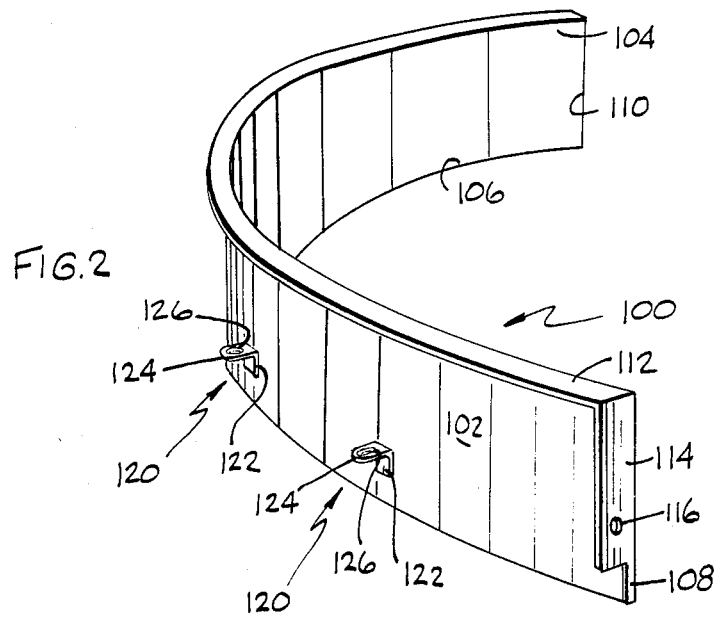
FIG. 2 is a perspective view of a safeguard adapted to be mounted on the power turn.

A safeguard 100 is illustrated in FIGS. 2–4 and comprises an arcuate side wall 102 having a radius of curvature similar to the radius of curvature of the downwardly projecting inner flange 49 of the top wall portion 48 for mating engagement therewith. The arcuate side wall 102 has a top edge portion 104, a bottom edge portion 106 and opposite end edge portions 108 and 110. An integral flange 112 projects radially outwardly from the top edge portion 104 and provides reinforcing strength for the arcuate side wall 102. Another flange 114 is integral with the arcuate side wall 102 and projects radially outwardly from the end edge portion 108. A similar flange 114 is provided on the end edge portion 110. An opening 116 extends through each of the flanges 114. A plurality of lugs 120 are secured to the arcuate side wall 102 and each of which comprises a base portion 122 having a radius of curvature similar to the radius of curvature of the arcuate side wall 102 so as to mate therewith and each of which is secured to the arcuate side wall 102 in spaced apart relationship by suitable means such as by welding. A support portion 124 is integral with the base portion 122 and projects radially outwardly therefrom at an angle of about 90 degrees and is located in a plane generally parallel to the bottom edge portion 106. An opening 126 extends through the support portion 124.

A plurality of lugs 130 are secured to the top wall portion 48 and each of which comprises a base portion 132 having a generally planar surface to mate with the generally planar surface of the top wall portion 48 and secured thereto by suitable means such as by welding. An upstanding wall portion 314 is integral with the base portion 132 and extends upwardly therefrom at an angle of about 90 degrees. A relatively flat support portion 136 is integral with the upstanding wall portion 134 and projects outwardly therefrom at an angle of about 90 degrees so as to lie in a plane generally parallel to but spaced from the top wall portion 48. An opening 138 extends through the support portion 136. As illustrated in FIGS. 3 and 4, the lugs 120 and 130 are located so that the safeguard 100 can be positioned with the side wall 102 in contact with the downwardly projecting flange 49 and the support portions 124 in contact with and supported by the support portions 136. The support portions 124 and 136 are secured together by headed threaded bolts 140 passing through the openings 126 and 138 and threaded nuts 142 threadingly engaged with the headed threaded bolts 140. A lug 144 is secured to the top wall 72 of the removable end portions 60 and 62 and comprises a base 146 secured to the top wall 72 by suitable means such as by welding and an upstanding lug portion 148 integral with the base 146 and extending upwardly therefrom at an angle of about 90 degrees. An opening 150 extends through the upstanding lug portion 148. As illustrated in FIG. 3, the flange 114 is secured to the upstanding lug portion 148 by a headed threaded bolt 152 passing through the openings 116 and 150 and a threaded nut 154 in threaded engagement with the threaded bolt 152. These structures provide a safe and readily usable system for attaching the safeguard 100 to the side wall portion 16 and the removable end portions 60 and 62.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An attachment for a power turn comprising:
a power turn having a frame having at least two opposite side wall portions comprising an arcuate outer side wall portion and an arcuate inner side wall portion;
a driving roll having one end portion rotatably mounted on said arcuate outer side wall portion and another end portion rotatably mounted on said arcuate inner side wall portion, said driving roll having a conically shaped outer surface and having a longitudinally extending axis of rotation;
driving means for rotating said driving roll;
an idler roll having one end portion rotatably mounted on said arcuate outer side wall portion and another end portion rotatably mounted on said arcuate inner side wall portion, said idler roll having a conically shaped outer surface and having a longitudinally extending axis of rotation;
an endless belt journaled for movement around said driving roll and said idler roll and moved by said driving roll;
said endless belt when journaled around said driving and idler rolls having an outer radius, an inner radius and opposite end surfaces;
cover means for covering at least the outer portion of said endless belt next adjacent to said outer radius;
said cover means comprising a main body portion comprising an arcuate side wall portion adapted to be secured to said arcuate other side wall portion of said frame and an integral top wall portion extending radially inwardly from said side wall portion and overlying said outer portion of said endless belt;
said main body portion having an arcuate extent less than the arcuate extent of said arcuate outer side wall portion so that at least said driving roll is not covered by said cover means;
at least one readily removable end portion for said cover means; and
said at least one readily removable end portion having an arcuate side wall adapted to be secured to said arcuate outer side wall portion, an integral top wall extending radially inwardly from said arcuate side wall and overlying at least a portion of said driving roll and an integral end wall extending radially inwardly from said arcuate side wall and downwardly extending from said top wall and covering at least a portion of one of said end surfaces of said endless belt.

2. The invention as in claim 1 and further comprising:
another readily removable end portion; and
said another readily removable end portion having an arcuate side wall adapted to be secured to said arcuate outer side wall portion, an integral top wall extending radially inwardly from said arcuate side wall and overlying at least a portion of said idler roll and an integral end wall extending radially inwardly from said arcuate side wall and covering at least a portion of the other one of said end surfaces of said endless belt.

3. An attachment for a power turn comprising:
a power turn having a frame having at least two opposite side wall portions comprising an arcuate outer side wall portion and an arcuate inner side wall portion;
a driving roll having one end portion rotatably mounted on said arcuate outer side wall portion and another end portion rotatably mounted on said arcuate inner side wall portion, said driving roll having a conically shaped outer surface and having a longitudinally extending axis of rotation;

driving means for rotating said driving roll;

an idler roll having one end portion rotatably mounted on said arcuate outer side wall portion and another end portion rotatably mounted on said arcuate inner side wall portion, said idler roll having a conically shaped outer surface and having a longitudinally extending axis of rotation;

an endless belt journaled for movement around said driving roll and said idler roll and moved by said driving roll;

said endless belt when journaled around said driving and idler rolls having an outer radius, an inner radius and opposite end surfaces;

cover means for covering at least the outer portion of said endless belt next adjacent to said outer radius;

said cover means comprising a main body portion comprising an arcuate side wall portion adapted to be secured to said arcuate outer side wall portion of said frame and an integral top wall portion extending radially inwardly from said wall portion and overlying said outer portion of said endless belt;

said main body portion having an arcuate extent less than the arcuate extent of said arcuate outer side wall portion so that at least said driving roll is not covered by said cover means;

at least one readily removable end portion for said cover means;

said at least one readily removable end portion having an arcuate side wall adapted to be secured to said arcuate outer side wall portion, an integral top wall extending radially inwardly from said arcuate side wall and overlying at least a portion of said driving roll and an integral end wall extending radially inwardly from said arcuate said wall and covering at least a portion of one of said end surfaces of said endless belt;

at least one support plate for providing an extension of said arcuate outer side wall portion;

securing means for securing said at least one support plate to said arcuate outer side wall portion;

a pair of spaced apart, open ended slots in said side wall of said removable end portion; and a pair of spaced apart headed threaded bolts in threaded engagement with threaded openings in said at least one support plate so that said removable end portion may be secured to said at least one support plate by passing said slots at least between said threaded headed bolts and said at least one support plate and tightening said threaded headed bolts.

4. The invention as in claim 3 and wherein said driving roll comprises:

a drive shaft having said one end portion rotatably mounted in said at least one support plate and said another end portion rotatably mounted in said inner arcuate side wall and connected to said driving means for rotating said driving roll; and a hollow body portion having said conically shaped outer surface secured to said drive shaft for rotation therewith.

5. The invention as in claim 4 and further comprising:

an endless chain secured to said outer portion of said endless belt;

a sprocket having a plurality of teeth secured to said drive shaft for rotation therewith; and said endless chain being in mesh with said teeth so as to be driven by said sprocket.

6. The invention as defined in claim 3 and further comprising:

at least another support plate for providing an extension of said arcuate outer side wall portion;

securing means for securing said at least another support plate to said arcuate outer side wall portion;

a pair of spaced apart, open ended slots in said side wall of said removable end portion; and a pair of spaced apart headed threaded bolts in threaded engagement with threaded openings in said at least another support plate so that said removable end portion may be secured to said at least another support plate by passing said slots at least between said threaded headed bolts and said at least another support plate and tightening said threaded headed bolts;

and wherein said idler roll comprises:

an idler shaft having said one end portion rotatably mounted in the other of said support plates and said another end portion rotatably mounted in said inner side wall portion; and a hollow body portion having said conically shaped outer surface secured to said idler shaft for rotation therewith.

7. The invention as in claim 6 and further comprising:

a sprocket having a plurality of teeth secured to said idler shaft for rotation with said idler shaft; and said endless chain being in mesh with said teeth on said sprocket so as to rotate said idler shaft.

8. The invention as in claim 7 and further comprising:

another removable end portion;

said another removable end portion having an arcuate side wall adapted to be secured to said arcuate outer side wall portion, an integral top wall extending radially inwardly from said side wall and overlying at least a portion of said idler roll and an integral end wall extending radially inwardly from said side wall and covering at least a portion of the other one of said end surfaces of said endless belt; and each of said removable end portions having an arcuate extent which is less than one-fourth of the arcuate extent of said main body portion.

9. An attachment for a power turn comprising:

a power turn having a frame having at least two opposite side wall portions comprising an arcuate outer side wall portion and an arcuate inner side wall portion;

a driving roll having one end portion rotatably mounted on said arcuate outer side wall portion and another end portion rotatably mounted on said arcuate inner side wall portion, said driving roll having a conically shaped outer surface and having a longitudinally extending axis of rotation;

driving means for rotating said driving roll;

an idler roll having one end portion rotatably mounted on said arcuate outer side wall portion and another end portion rotatably mounted on said arcuate inner side wall portion, said idler roll having a conically shaped outer surface and having a longitudinally extending axis of rotation;

an endless belt journaled for movement around said driving roll and said idler roll and moved by said driving roll;

said endless belt when journaled around said driving and idler rolls having an outer radius, an inner radius and opposite end surfaces;

cover means for covering at least the outer portion of said endless belt next adjacent to said outer radius;

said cover means comprising a main body portion comprising an arcuate side wall portion adapted to be secured to said arcuate outer side wall portion of said frame and an integral top wall portion extending radially inwardly from said side wall portion and overlying said outer portion of said endless belt;

said top wall portion having an arcuate inner wall portion;

said top wall portion having a generally planar surface;

a first plurality of lugs attached to said top wall portion at spaced apart locations;

each of said first plurality of lugs having a support portion having a generally planar surface extending in a plane spaced above and generally parallel to said generally planar surface of said top wall portion;

a safeguard comprising at least an arcuate side wall having a radius of curvature for mating engagement with said arcuate inner wall portion of said top wall portion;

a second plurality of lugs attached to said arcuate side wall of said safeguard at spaced apart locations to mate with said first plurality of lugs;

each of said second plurality of lugs having a support portion having a generally planar surface so that each of said support portions of said second plurality of lugs will be in mating contacting relationship with said support portion of each of said first plurality of lugs; and securing means for securing together said first and second plurality of lugs.

10. The invention as in claim 9 wherein said securing means comprises:

an opening extending through each of said support portions of said first and second plurality of lugs;

a headed bolt having a threaded stem portion passing through said openings; and a threaded nut secured to said threaded stem portion and tightened to clamp said support portions together.

11. The invention as in claim 10 wherein each of said first plurality of lugs comprises:

a base portion having a generally planar surface welded to said generally planar surface of said top wall portion;

an upstanding wall portion integral with said base portion and extending upwardly therefrom at an angle of about 90 degrees; and said support portion being integral with said upstanding wall portion and projecting outwardly therefrom at an angle of about 90 degrees.

12. The invention as in claim 11 wherein each of said second plurality of lugs comprises:

a base portion having an arcuate surface welded to said arcuate side wall of said safeguard; and said support portion being integral with said base portion and extending outwardly therefrom at an angle of about 90 degrees.

13. The invention as in claim 12 and further comprising:

said arcuate side wall of said safeguard having a top edge portion and a bottom edge portion;

said second plurality of lugs being located between said top edge portion and said bottom edge portion; and a flange integral with said top edge portion and projecting radially outwardly therefrom for reinforcing said arcuate side wall.

14. The invention as in claim 13 wherein:

said first plurality of lugs comprise at least four lugs; and said second plurality of lugs comprise at least four lugs.

15. The invention as in claim 9 and further comprising:

a pair of spaced apart support plates providing extensions for said arcuate outer side wall portion;

said cover means having a main body portion having an arcuate extent less than the arcuate extent of said arcuate outer side wall portion and said support plates so that at least said driving roll is not covered by said cover means;

at least one removable end portion for said cover means;

said at least one removable end portion having an arcuate side wall adapted to be secured to said one of said support plates, an integral top wall extending radially inwardly from said arcuate outer side wall and overlying at least a portion of said driving roll and an integral end wall extending radially inwardly from said arcuate side wall and covering at least a portion of one of said end surfaces of said endless belt;

an upstanding lug portion extending upwardly from said top wall of said at least one removable end portion;

said arcuate side wall of said safeguard having opposite end edge portions;

a flange integral with said arcuate side wall of said safeguard extending radially outwardly from one of said end edge portions; and securing means for securing together said upstanding lug portion and said flange of said one end edge portion.

16. The invention as in claim 15 and further comprising:

another removable end portion;

said another removable end portion having an arcuate side wall adapted to be secured to the other of said support plates, an integral top wall extending radially inwardly from said side wall and overlying at least a portion of said idler roll and an integral end wall extending radially inwardly from said side wall and covering at least a portion of the other one of said end surfaces of said endless belt;

an upstanding lug portion extending upwardly from said top wall of said another removable end portion;

a flange integral with said arcuate side wall portion of said safeguard extending radially outwardly from the other one of said end edge portions; and securing means for securing together said upstanding lug portion of said another removable end portion and said flange of said other one of said end edge portions.

17. The invention is in claim 16 wherein said driving roll comprises:

a drive shaft having said one end portion rotatably mounted on one of said support plates and said another end portion rotatably mounted on said inner arcuate side wall and connected to said driving means for rotating said driving roll; and a hollow body portion having said conically shaped outer surface secured to said drive shaft for rotation therewith.

18. The invention as in claim 17 and further comprising:

an endless chain secured to said outer portion of said endless belt;

a sprocket having a plurality of teeth secured to said drive shaft for rotation therewith; and said endless chain being in mesh with said teeth so as to be driven by said sprocket.

19. The invention as defined in claim 18 wherein said idler roll comprises:

an idler shaft having said one end portion rotatably mounted on the other of said support plates and said another end portion rotatably mounted on said arcuate inner side wall portion; and a hollow body portion having said conically shaped outer surface secured to said idler shaft for rotation therewith.

20. The invention as in claim 19 and further comprising:

a sprocket having a plurality of teeth secured to said idler shaft for rotation with said idler shaft; and said endless chain being in mesh with said teeth on said sprocket so as to rotate said idler shaft.

* * * * *